United States Patent
Valvo (10) Patent No.: US 10,112,517 B1
(45) Date of Patent: Oct. 30, 2018

(54) VEHICLE RACK

(71) Applicant: Brent Joseph Valvo, Orland, CA (US)

(72) Inventor: Brent Joseph Valvo, Orland, CA (US)

( * ) Notice: Subject to any disclaimer, the term of this patent is extended or adjusted under 35 U.S.C. 154(b) by 0 days.

(21) Appl. No.: 15/592,549

(22) Filed: May 11, 2017

Related U.S. Application Data (60) Provisional application No. 62/335,569, filed on May 12, 2016.

(51) Int. Cl.
| | | |
|---|---|---|
| *B60P 1/28* | (2006.01) | |
| *B60P 1/04* | (2006.01) | |
| *B62D 33/02* | (2006.01) | |
| *B60P 1/06* | (2006.01) | |
| *B60P 1/16* | (2006.01) | |
| *B60P 3/40* | (2006.01) | |

(52) U.S. Cl.
CPC ............... *B60P 1/04* (2013.01); *B60P 1/06* (2013.01); *B60P 1/16* (2013.01); *B60P 3/40* (2013.01); *B62D 33/0207* (2013.01)

(58) Field of Classification Search
CPC .. B60P 3/07; B60P 3/08; B60P 3/1025; B60P 3/1033; B60P 3/122; B60P 3/40; B60P 3/42; B60P 3/062; B60P 1/04; B60P 3/06; B66F 7/08
USPC ........... 224/405; 296/26.05, 26.06, 26.07, 3; 414/462, 484, 494, 495, 556
See application file for complete search history.

(56) References Cited

U.S. PATENT DOCUMENTS

| | | | | | |
|---|---|---|---|---|---|
| 3,051,340 | A | * | 8/1962 | Ely ........................... | B60P 3/07 187/211 |
| 3,752,331 | A | * | 8/1973 | Colburn ................ | B66F 7/0608 180/125 |
| 3,872,989 | A | * | 3/1975 | Smithson .............. | B60P 3/1025 254/128 |
| 3,931,895 | A | * | 1/1976 | Grimaldo ................. | B60P 3/07 414/495 |
| 3,972,433 | A | * | 8/1976 | Reed ...................... | B60P 3/1025 224/310 |
| 4,221,420 | A | * | 9/1980 | Vencill ...................... | B60P 3/08 254/122 |
| 4,274,788 | A | * | 6/1981 | Sutton ................... | B60P 3/1033 224/310 |
| 4,589,814 | A | * | 5/1986 | Cates .................... | B60P 3/1033 280/414.1 |
| 4,659,131 | A | * | 4/1987 | Flournoy, Jr. ............. | B60R 9/00 296/3 |
| 5,114,202 | A | * | 5/1992 | Johnson ................... | B60P 3/07 296/26.05 |
| 5,190,337 | A | * | 3/1993 | McDaniel ................ | B60P 3/42 224/405 |

(Continued)

*Primary Examiner* — Gregory W Adams
(74) *Attorney, Agent, or Firm* — William Bodnar (57) ABSTRACT

Embodiments of the invention cover a variety of assemblies that can be used for loading, unloading and securing materials for transport. In all embodiments, the storage rack assembly includes a first horizontal support, at least one vertical lift arm connected to the horizontal support, and at least one lifting mechanism integral to a vertical lift arm wherein the assembly is attachable to the rear section of a vehicle. The vertical lift arm can, in some embodiments, also function as the lifting mechanism. A unique feature of all embodiments is the ability to raise and lower the rear section of the storage rack to accommodate the loading and unloading of materials.

3 Claims, 7 Drawing Sheets

(56) References Cited

U.S. PATENT DOCUMENTS

| | | | | |
|---|---|---|---|---|
| 5,562,390 | A | * | 10/1996 | Christenson .............. B60P 1/16 |
| | | | | 414/408 |
| 6,450,742 | B1 | * | 9/2002 | Jenkins .................... B60P 3/08 |
| | | | | 410/24 |
| 6,666,490 | B1 | * | 12/2003 | Thacker ................. B60J 7/1614 |
| | | | | 296/100.08 |
| 6,676,220 | B2 | * | 1/2004 | Mistier .................... B60P 1/28 |
| | | | | 298/1 A |
| 8,113,562 | B2 | * | 2/2012 | Skoglun ................ B62D 33/08 |
| | | | | 224/405 |
| 8,491,059 | B2 | * | 7/2013 | Smith ...................... B60P 3/40 |
| | | | | 298/1 A |
| D695,675 | S | * | 12/2013 | Voglmayr ................... D12/414 |
| 2009/0025154 | A1 | * | 1/2009 | Smith .................... B60P 1/431 |
| | | | | 14/71.7 |
| 2015/0132090 | A1 | * | 5/2015 | Giamatti .................. B60P 1/02 |
| | | | | 414/462 |

* cited by examiner

VEHICLE RACK

CROSS REFERENCE TO RELATED APPLICATIONS

This application claims priority to provisional application 62/335,569 filed on May 12, 2016. The contents of U.S. Provisional Patent Application 62/335,569 are incorporated herein by reference.

FIELD OF THE INVENTION

This present invention relates to an adjustable mounting assembly that can be mounted on a vehicle. The mounting assembly frame can be lowered at the rear portion to facilitate loading and unloading of materials to and from the frame.

BACKGROUND OF THE INVENTION

The adjustable mounting assembly disclosed herein provides solutions to problems inherent in the related art.

SUMMARY OF EMBODIMENTS OF THE INVENTION

Embodiments of the present invention provide a new and improved mounting assembly that can be utilized to load, unload and/or store materials for transport. A unique feature of all embodiments is that the assembly includes a first horizontal support, at least one vertical support connected to the horizontal support, and at least one mechanical lifting mechanism integral to a vertical support wherein the assembly is attachable to the rear section of a vehicle. This allows the assembly or the rear section of the assembly to be lowered to facilitate loading and unloading of materials for transport.

BRIEF DESCRIPTION OF DRAWINGS

The invention is illustrated in the following drawings.

DETAILED DESCRIPTION OF THE PREFERRED EMBODIMENTS

Figure 1:
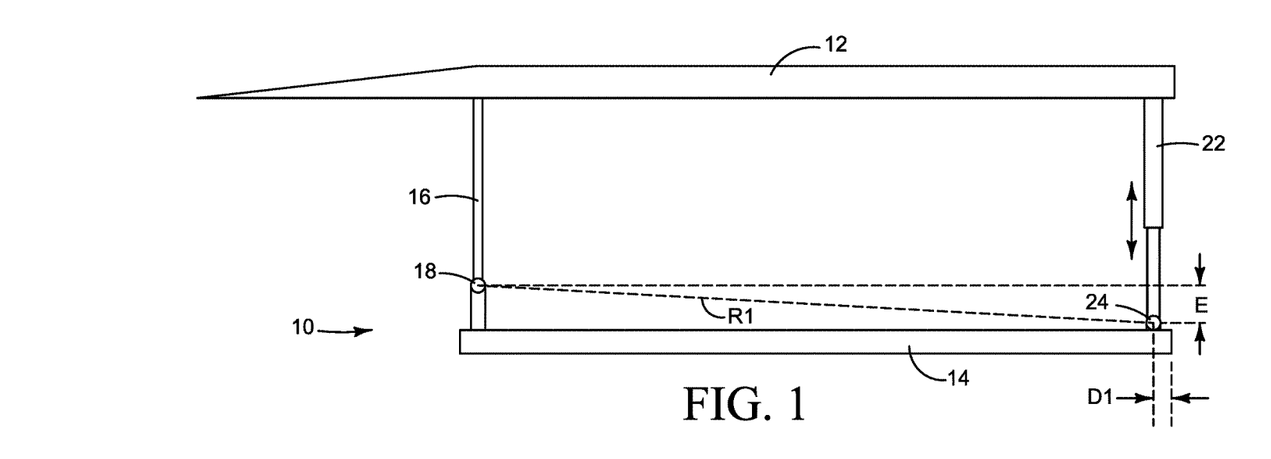
FIG. 1 is a left side view of an embodiment of a storage rack assembly having pivots at the front and (optionally) rear sections of the assembly showing the assembly in the loaded/unloaded (raised) position. Also contained in FIG. 1 is the rear section of the assembly which is an embodiment of the invention in and of itself.
Figure 2:
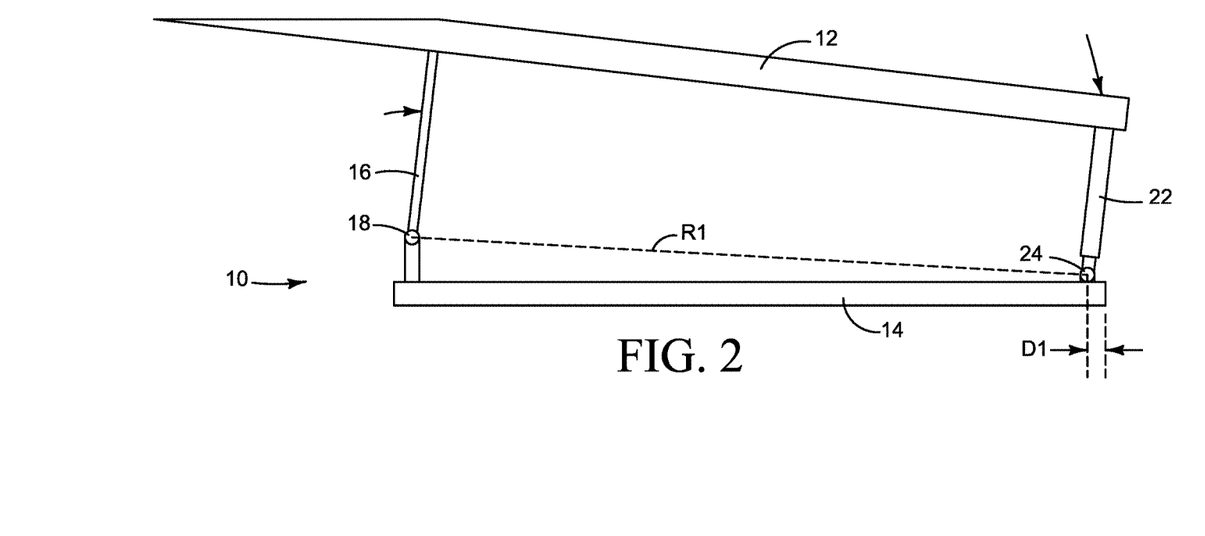
FIG. 2 is a left side view of an embodiment having pivots at the front and (optionally) rear sections of the assembly showing the assembly in the loading (lowered) position.

Different embodiments of the invention are illustrated in FIGS. 1 and 2. One embodiment includes the rear section of the assembly only and includes no pivot component (as will be explained herein). Another embodiment utilizes at least one pivot at the front and rear sections and yet another embodiment utilizes at least one pivot at the front section only. The assembly 10 includes a top rail section 12 and a bottom mounting rail section 14. The front section includes at least one support component 16 and at least one pivot mechanism 18. The rear section includes at least one mechanical or electromechanical lifting mechanism to vary the length/height of the rear section. One embodiment of a mechanical lifting mechanism is a jack 22 to raise and lower the rear section for loading and transporting material placed on the assembly 10.

The embodiment of FIGS. 1 and 2 shows a front pivot placement a distance above the lower, mounting rail section 14. The vertical distance of front pivot 18 is indicated by dimension E. In these embodiments the jack 22 can cause the rear section to travel a distance that is approximately two times the distance designated by E. Note that the vertical placement of front pivot 18 is approximately at the midway point of the travel distance of the rear section in this embodiment.

The assembly is shown fully lowered in FIG. 2. At this position the jack 22 has reached the limit of its travel and the rear section has been lowered to facilitate loading or unloading of materials on the assembly. The horizontal position of the center of the rear support component 24 does not change relative to the end of the bottom section as indicated by the dimension D1 shown in FIGS. 1 and 2.

In all embodiments having a front section, there is at least one pivot forward the rear section. In one embodiment component 24 is fixed and does not pivot. The radius R1 denotes the distance from the front pivot 18 to the rear section at 24 when the rear section is in the raised or lowered position. As indicated previously, the distance that the rear section travels vertically is approximately twice the dimension E. The distance from front pivot 18 to a point on the rear section at the midpoint of the vertical travel distance of the rear section is slightly greater than the distance R1. Therefore if an embodiment did not have a rear pivot, compensation would be required. One method of compensation is through the use of flexible materials however many other methods are contemplated.

Figure 3:
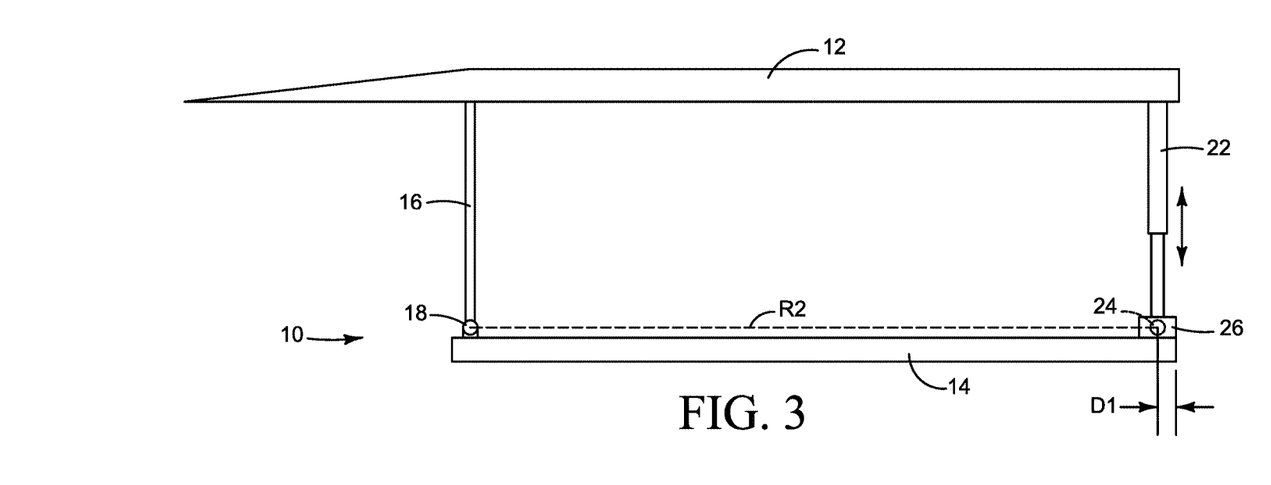
FIG. 3 is a left side view of an embodiment having pivots at the front and rear sections of the assembly showing the assembly in the loaded/unloaded (raised) position.
Figure 4:
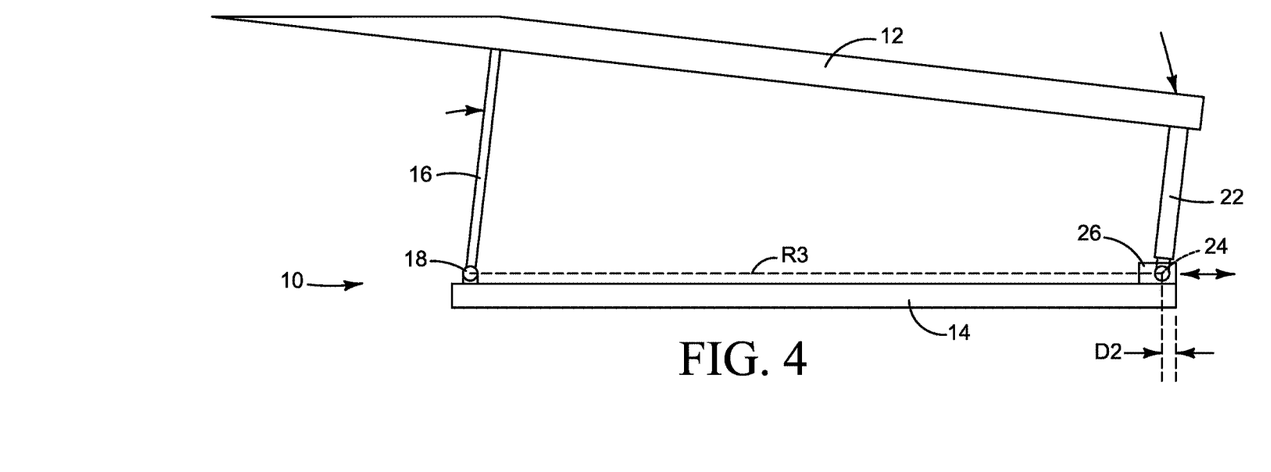
FIG. 4 is a left side view of an embodiment having pivots at the front and rear sections of the assembly showing the assembly in the loading (lowered) position.

FIGS. 3 and 4 show a left side view of an embodiment of the assembly having at least one fixed pivot 18 in the front section and at least one adjustable pivot 24 that can also move laterally in the rear section. The pivot 24 can move towards the front or back of the pivot housing 26. The distance between the pivot 24 and the back of the pivot housing 26 is designated as D1. As the rear section of the assembly is lowered in FIG. 4, the pivot itself moves slightly toward the back of the pivot housing as shown by dimensions D1 and D2. As a result R3 is greater than R2. Typically the length of R2 is five to six feet and the vertical travel distance is less than 12 inches therefore the dimensions indicated by D1 and D2 are small.

Figure 5:
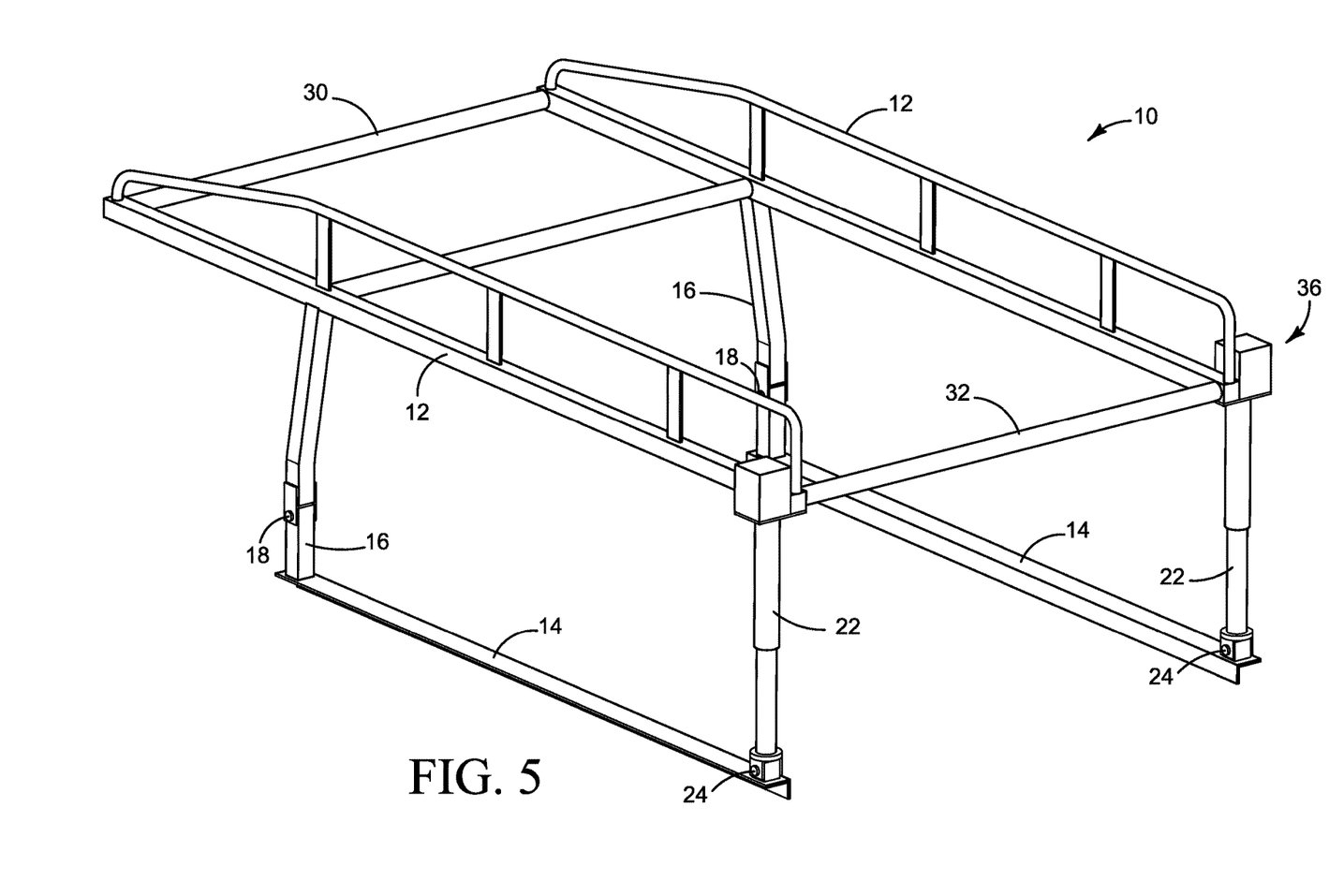
FIG. 5 is a perspective view of the embodiment shown in FIG. 1 in the loaded/unloaded (raised) position.
Figure 6:
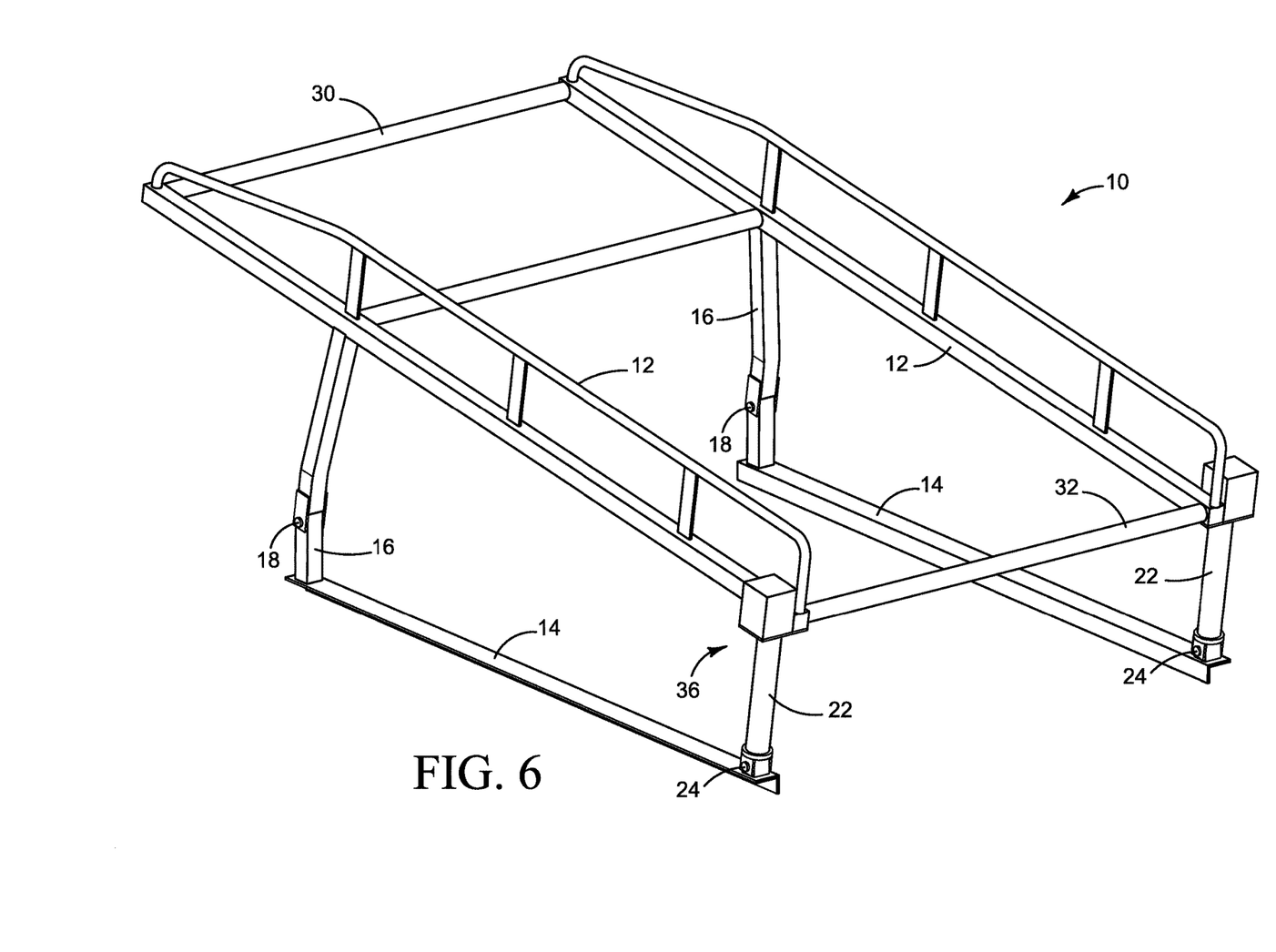
FIG. 6 is a perspective view of the embodiment shown in FIG. 2 in the loading (lowered) position.

FIG. 5 is a perspective view of the embodiment shown in FIG. 1 in the loaded/unloaded (raised) position. This embodiment can utilize a rear pivot 24 optionally. An optional actuator 36 can dictate the vertical positon of the rear section by control of the movement of the lifting mechanism 22. Electrical or mechanical means could also be used to move the rear section up and down. The jack 22 shown is one viable means. FIG. 6 is a perspective view of the embodiment of FIG. 5 in the loading (lowered) position. A pivot mechanism 24 can be utilized to facilitate raising or lowering of the assembly.

Figure 7:
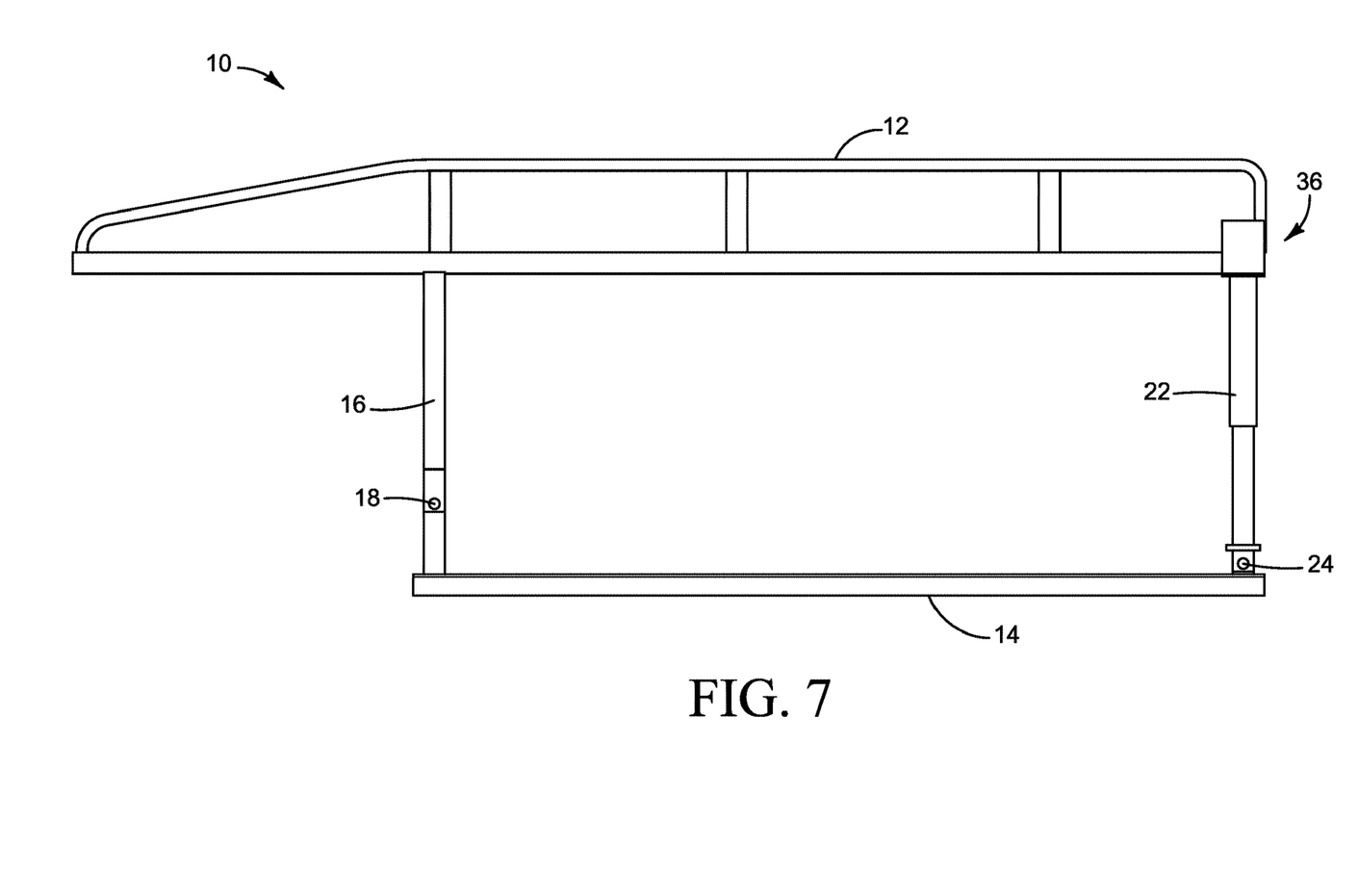
FIG. 7 is a side view of the embodiment shown in FIG. 2 in the loaded/unloaded (raised) position.
Figure 8:
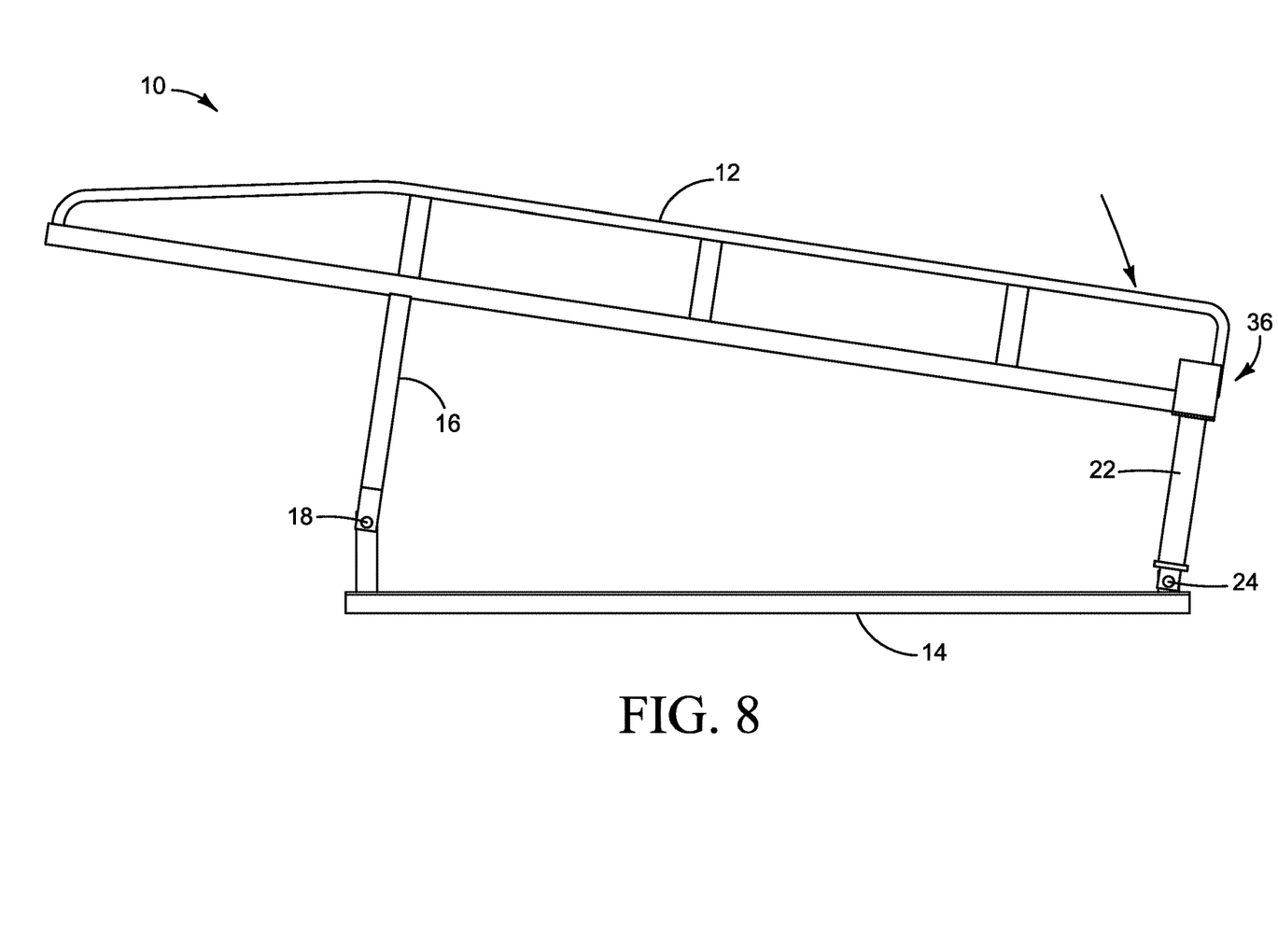
FIG. 8 is a side view of the embodiment shown in FIG. 2 in the loading (lowered) position.
Figure 9:
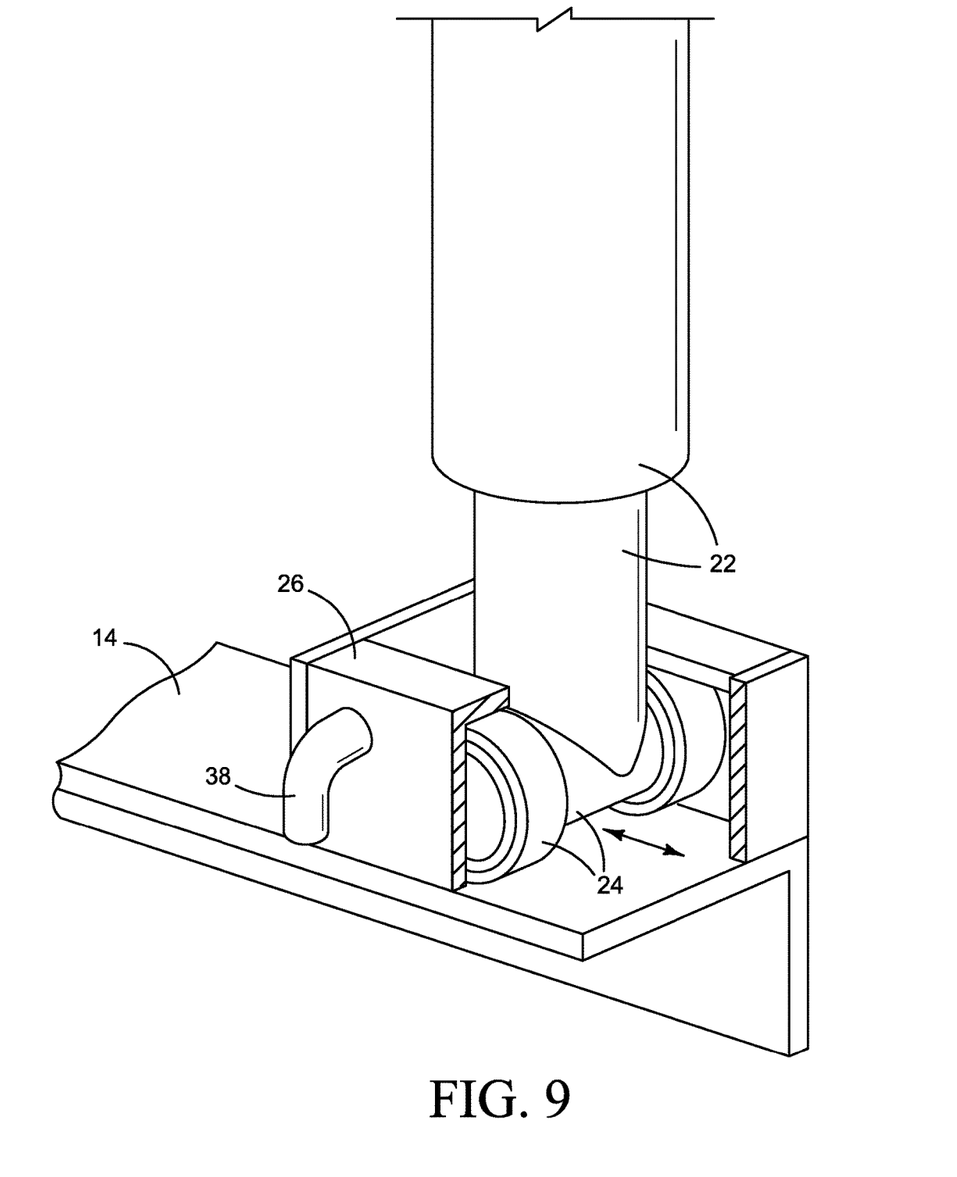
FIG. 9 is a close-up view of an adjustable pivot mechanism embodiment.

FIGS. 7 and 8 show the left and right side views of the assembly in the raised and lowered positions. A rear pivot 24 is optional. FIG. 9 shows a close-up of an adjustable pivot mechanism. In addition to having the ability to rotate, this pivot mechanism can also move in a horizontal manner along the length of the bottom mounting rail. This embodiment shows the use of a pivot shaft with wheels 24 within a pivot housing 26 allowing horizontal (front to back) movement of the pivot within the housing 26. An optional locking mechanism 38 is also shown.

Glossary of Terms

Actuator: A device responsible for activating a mechanical, electrical, hydraulic or pneumatic device.

Assembly: Collection of parts arranged in a particular manner.

Horizontal: Parallel to, in the plane of, or operating in a plane parallel to the horizon or to a baseline. As used herein, horizontal is used in reference to the baseline, i.e. bottom rail of mounting section, of the frame assembly. Horizontal is also not limited to being exactly parallel. Therefore a pivot component that can move laterally in a horizontal direction is not limited to travel that is exactly parallel to the baseline.

Integral: Consisting or composed of parts that together constitute a whole.

Lift Arm Mechanism: A device used for raising and lowering the lift arms of a storage rack by mechanical, electrical, hydraulic or pneumatic means.

Mechanical Lifting Mechanism: A device used for raising and lowering an object or objects utilizing mechanical advantage. A hydraulic jack is one type of mechanical lifting mechanism. Electromechanical devices are another type of lifting mechanism.

Pivot: A pin or shaft on which a mechanical component turns.

Ratchet Jack: A jack that is raised or lowered by means of a pawl and ratchet.

Travel seat: An area for a rear pivot component to travel forward and backwards. The travel seat shown herein is bounded below by the top of the support rail 14 and on the sides by the rear slider mechanism components 26 (see FIG. 9).

CONCLUSIONS, OTHER EMBODIMENTS, AND SCOPE OF INVENTION

Embodiments of the invention cover a variety of assemblies that can be used for loading, unloading and securing materials for transport. In the broadest embodiment, the assembly includes a first horizontal support, at least one vertical support connected to the horizontal support, and at least one mechanical lifting mechanism integral to a vertical support wherein the assembly is attachable to the rear section of a vehicle. As illustrated, FIG. 5 discloses horizontal support/cross members 30, 32, at least one vertical support 22 and at least one mechanical lifting mechanism 22 integral to a vertical support. The lifting mechanism can, in some embodiments, also function as the vertical support.

In another embodiment, the assembly includes a frame with connected front and rear sections and at least one pivot component forward the rear section of the frame. Placement of the pivot can, for example, be at the front section, middle section or at any point between the front and rear sections. Placement of the pivot at the front section will allow the front section to be raised when the rear section is lowered. Placement of the pivot between the front and rear sections can allow the front section to remain stationary when the rear section is lowered. Another embodiment includes at least one pivot component at both the front and rear sections of the frame. Yet one other embodiment includes at least one pivot component at the front section and at least one pivot component at the rear section wherein the at least one rear pivot component is moveable laterally in a horizontal direction.

An embodiment of the invention with a connected front and rear section that utilizes at least one pivot component only at the front section can function (albeit differently from an embodiment with at least one pivot component at the front and rear sections). The embodiment with at least one pivot at the front section only will inherently have to be designed to accommodate for the stresses on the rear section as the assembly is raised and lowered as illustrated in the figures. The stresses can be accommodated for by a variety of methods including, but not limited to, the use of flexible materials in the frame that allow the frame to deform slightly. In addition, the relationship between the length of the assembly frame and the height of travel of the rear section dictates how much lateral movement is anticipated and how much related stress the rear section is subjected to when there is no rear pivot present.

The mechanical lifting mechanism described herein is a jack. Any suitable means of raising and lowering the frame assembly using mechanical advantage can be utilized. Control of the lifting mechanism can be by mechanical, electrical or electromechanical means. The frame assembly materials can be of any type of materials suitable for the purpose. The pivot component can be any type of mechanism that allows the frame member attached thereto to rotate is a suitable fashion.

The embodiments herein have been described as being attachable to a vehicle. The scope of the invention also includes all embodiments disclosed herein in combination with a vehicle thereto attached.

The above description presents the best mode contemplated in carrying out the invention. However, it is susceptible to modifications and alternate constructions from the embodiments shown in the drawings and accompanying description. Consequently it is not intended that the invention be limited to the particular embodiments disclosed. On the contrary, the invention is intended to cover all modifications, sizes and alternate constructions falling within the spirit and scope of embodiments of the invention.

What is claimed is:

1. A position-adjustable storage rack comprising:
   a left side and a right side top rail, the top rails held substantially parallel and spaced apart by the two or more cross members fixed or otherwise connected perpendicularly to the top rails, the cross members and top rails forming a rectangular frame;
   a left side and a right side bottom mounting rail, the mounting rails oriented substantially in a same direction as the top rails, the bottom rails spaced apart substantially parallel;
   a left side and a right side from vertical support arm, the support arms fixed or otherwise connected at the lower ends thereof to the ends of the mounting rails and fixed or otherwise connected at the upper ends thereof to the top rails;

a left side and a right side rear vertical lift arm, the lift arms fixed or otherwise connected at the lower ends thereof to the mounting rails and fixed or otherwise connected at the upper ends thereof to the top rails;

at least one lift arm mechanism capable of raising and lowering the lift arms;

wherein the lift arms may be raised or lowered to increase or reduce the height of the rear end of the storage rack and wherein the left and right front vertical support arms are pivotally attached to either the mounting rails or the top rails or are each segmented about a pivot mechanism to enable articulation of the support arms to accommodate the lifting or lowering motion of the rear end of the storage rack;

the storage rack further including a left lift arm travel seat and a right lift arm travel seat, the travel seats having opposing lateral walls and end walls and each having a top wall, the travel seats fixed to the mounting rails and disposed one each toward the rear ends of the mounting rails, the top walls each including an elongate relief slot placed there through, the relief slots aligned in the general direction of the mounting rails, and wherein the left and right lift arms each include a wheeled axle centrally disposed on the lower ends thereof, the wheeled axle including a left and right wheel rotatably mounted on each end of the axle, each wheeled axle seated within a travel seat and capable of back and forth travel in the direction of the mounting rails, the travel distance governed at least in part by the length of the relief slots in the travel seats.

2. The storage rack of claim 1 wherein the left and right front support arms are pivotally connected to the mounting rails.

3. The storage rack of claim 1 wherein each travel seat includes an externally operable locking brake for stopping travel of the lift arm wheeled axle ends seated therein.

* * * * *